UNITED STATES PATENT OFFICE 2,290,759

TETRACHLOROSTYRENE AND METHOD OF PREPARING THE SAME

Arthur A. Levine and Oliver W. Cass, Niagara Falls, N. Y., assignors to E. I. du Pont de Nemours & Company, Wilmington, Del., a corporation of Delaware No Drawing. Application March 18, 1940, Serial No. 324,617

7 Claims. (Cl. 260—650)

This invention relates to the preparation of valuable chlorinated aromatic compounds. More particularly, it relates to the preparation of tetrachlorostyrene from ethyltetrachlorobenzene as a starting material. The present application is a continuation-in-part of our copending application Serial No. 136,024, filed April 9, 1937, which is directed to the preparation of pentachlorostyrene from ethylpentachlorobenzene.

Ethyltetrachlorobenzene is readily prepared by the nuclear chlorination of ethylbenzene. The chlorination is carried out in the absence of light and in the presence of a chlorine carrier which is metallic iron. The tetrachloride is separated by distillation from the dichlorides and tetrachlorides which are formed in small amounts. The product thus obtained is a mixture of the three possible isomers of ethyltetrachlorobenzene.

Our process for the preparation of tetrachlorostyrene from ethyltetrachlorobenzene involves two steps. In the first step, ethyltetrachlorobenzene is reacted with chlorine under conditions such that mono-chlorethyltetrachlorobenzene is formed. In the second step, the mono-chlorethyltetrachlorobenzene is converted to tetrastyrene by splitting off hydrogen chloride from the side chain.

Accordingly, one of the objects of this invention involves the preparation of tetrachlorostyrene from ethyltetrachlorobenzene in satisfactory yield. Another object is the preparation of the desired product, tetrachlorostyrene, by means of a two-stage process involving two separate chemical reactions. The first of these reactions involves the preparation of mono-chlorethyltetrachlorobenzene, and the second the conversion of that product to tetrachlorostyrene.

The various isomers of tetrachlorostyrene represented by the formula $C_6HCl_4.CH=CH_2$ are believed to be new compounds never before described in the chemical literature. It is, therefore, a further object of this invention to produce these new chemical compounds. Other objects and advantages of the invention will be apparent from the ensuing detailed disclosure.

In order to convert ethyltetrachlorobenzene to mono-chlorethyltetrachlorobenzene, the ethyltetrachlorobenzene starting material may be reacted with chlorine in the presence of light and in the absence of any chlorine carrier until approximately 50% of the amount of chlorine theoretically required for the introduction of one chlorine atom per mole of ethyltetrachlorobenzene has been added. This gives a mixture of approximately 50% unchanged ethyltetrachlorobenzene and 50% mono-chlorethyltetrachlorobenzene. If much more than 50% of the theoretical chlorine is added, the yields are decreased due to the formation of higher chlorides. The reaction involved is represented by the following equation:

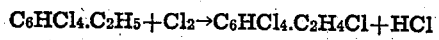
$$C_6HCl_4.C_2H_5 + Cl_2 \rightarrow C_6HCl_4.C_2H_4Cl + HCl$$

The mixture of unchanged ethyltetrachlorobenzene and chlorethyltetrachlorobenzene may be separated into its constituents by vacuum distillation. In the course of the distillation, it is important that the temperature does not exceed about 225° C. as the chlorethyltetrachlorobenzene undergoes decomposition at higher temperatures.

Tetrachlorostyrene is most conveniently prepared from the chlorethyltetrachlorobenzene simply by distillation at atmospheric pressure. At the temperature of distillation, the chlorine atom in the ethyl side chain is released as hydrogen chloride, converting the chlorethyl group to a vinyl group and thus forming tetrachlorostyrene. The reaction is as follows:

$$C_6HCl_4.C_2H_4Cl \rightarrow C_6HCl_4.CH=CH_2 + HCl$$

Alternatively the chlorethyltetrachlorobenzene may be converted to tetrachlorostyrene by treatment of the former with a base as, for example, alcoholic potassium hydroxide, or the removal of one molecule of HCl from the chlorethyl side chain of chlorethyltetrachlorobenzene may be effected by means of any of the other usual dehydrohalogenation treatments known in the art.

The invention may be further illustrated by the specific procedure described in the following example:

EXAMPLE

*Preparation of ethyltetrachlorobenzene*

A mixture of the isomers of ethyltetrachlorobenzene was prepared in the following manner:

636 grams (6.8 moles) of ethylbenzene was placed in a two-liter, three-necked flask fitted with a stirrer, a thermometer, an inlet tube for chlorine and a reflux condenser leading to a scrubbing system for absorbing the evolved hydrogen. Iron filings in the amount of 15 grams were then added to the flask and operation of the stirrer begun.

Chlorine gas was then passed in and the temperature of the reaction vessel was maintained below 30° C. at all times by externally cooling the flask. The flask and its contents were carefully screened from light during the chlorination period. After 864 grams (28.8 moles) of hydrogen chloride had been absorbed by the scrubbing system the chlorination was stopped. The amount of chlorine absorbed corresponded to about 4.2 moles of chlorine for each mole of ethylbenzene. The reaction mixture was then decanted from the iron catalyst, washed once with water, once with a solution of sodium bicarbonate, again with water and then dried.

The major portion of the product, when distilled, was found to have boiling points within the range 260 to 285° C. This fraction consisted principally of the various isomers of ethyltetrachlorobenzene.

*Conversion of ethyltetrachlorobenzene to mono-chlorethyltetrachlorobenzene*

732 grams (3 moles) of ethyltetrachlorobenzene was charged into a reaction vessel equipped with a stirrer, a chlorine inlet tube, a thermometer, and a reflux condenser leading to a hydrogen chloride trap containing water. The reaction vessel was illuminated by means of an incandescent lamp.

The ethyltetrachlorobenzene was then heated to about 100–110° C. and 108 grams (2.52 moles) of chlorine was gradually introduced. During the course of the reaction, 54 grams of hydrogen chloride was evolved and the gain in weight of the contents of the flask was approximately 51 grams.

The reaction mixture was then vacuum-distilled under an absolute pressure of 10 mm. of mercury. The portion distilling below a temperature of 150° C. consisted principally of unchanged ethyltetrachlorobenzene. The fraction distilling between 150 and 170° C. consisted essentially of a mixture of the isomers of mono-chlorethyltetrachlorobenzene. The product had a density of 1.523 at 50° C. and a melting point below —40° C.

*Conversion of mono-chlorethyltetrachlorobenzene to tetrachlorostyrene*

The mixture of mono-chlorethyltetrachlorobenzene isomers, as obtained by the procedure described above, was distilled at atmospheric pressure, re-distilled a second time, and finally blown with air until no further hydrogen chloride could be removed. The final product had a density of 1.509 at 50° C., a freezing point below —40° C. and had a boiling range of 295–315° C. The product was essentially a mixture of the three possible isomers of tetrachlorostyrene.

Tetrachlorostyrene as prepared above differs markedly from unchlorinated styrene. It is a remarkably stable material and shows no tendency to polymerize under the action of either light or heat.

Because of its stability, low melting point and other desirable properties, tetrachlorostyrene is adapted for use either alone or in combination with other materials for such varied purposes as dielectric media for electrical apparatus, media for transferring heat at elevated temperatures, brake fluids and hydraulic brake systems, extreme pressure lubricants, absorbents in scrubbing systems, cooling agents for internal combustion engines, etc.

It is to be understood that our invention is not restricted to the specific embodiments described hereinabove, but includes all such modifications, variations, and equivalents, as fall within the scope of the appended claims.

We claim:

1. A process for preparing tetrachlorostyrene which comprises chlorinating ethyltetrachlorobenzene to form a mono-chlorethyltetrachlorobenzene and subjecting said mono-chloroethyltetrachlorobenzene to dehydrochlorination conditions, thereby removing one mole of hydrogen chloride and forming tetrachlorostyrene.

2. A process for preparing tetrachlorostyrene which comprises reacting ethyltetrachlorobenzene with chlorine in the absence of a halogenation catalyst, but in the presence of light, to form mono-chlorethyltetrachlorobenzene and then subjecting said mono-chlorethyltetrachlorobenzene to dehydrochlorination conditions to form tetrachlorostyrene.

3. A process of preparing tetrachlorostyrene which comprises reacting ethyltetrachlorobenzene with chlorine in the absence of a halogenation catalyst, but in the presence of light, to form mono-chlorethyltetrachlorobenzene and then pyrolytically decomposing said mono-chlorethyltetrachlorobenzene to form tetrachlorostyrene.

4. A process for preparing tetrachlorostyrene from mono-chlorethyltetrachlorobenzene which comprises subjecting said mono-chlorethyltetrachlorobenzene to dehydrochlorination conditions, thereby removing one mole of hydrogen chloride per mole of mono-chlorethyltetrachlorobenzene.

5. A process for preparing tetrachlorostyrene which comprises subjecting mono-chlorethyltetrachlorobenzene to thermodecomposition, thereby removing one mole of hydrogen chloride per mole of mono-chlorethyltetrachlorobenzene.

6. Tetrachlorstyrene.

7. A composition comprising essentially mixed isomers of tetrachlorostyrene.

ARTHUR A. LEVINE.
OLIVER W. CASS.